(12) United States Patent
Danner et al.

(10) Patent No.: US 8,854,721 B2
(45) Date of Patent: Oct. 7, 2014

(54) COMPONENTS AND TESTING METHODS FOR USE IN THE PRODUCTION OF ELECTRO-OPTIC DISPLAYS

(75) Inventors: Guy M. Danner, Somerville, MA (US); Jonathan L. Zalesky, Watertown, MA (US); John E. Ritter, Westford, MA (US); Timothy J. O'Malley, Wakefield, MA (US); Thomas H. Whitesides, Victoria (CA); Shamus Ford Patry, Vernon, CT (US); Alain Bouchard, Dorchester, MA (US); Richard M. Webber, Brookline, MA (US)

(73) Assignee: E Ink Corporation, Billerica, MA (US)

( * ) Notice: Subject to any disclaimer, the term of this patent is extended or adjusted under 35 U.S.C. 154(b) by 169 days.

(21) Appl. No.: 12/905,690

(22) Filed: Oct. 15, 2010

(65) Prior Publication Data

US 2011/0032596 A1 Feb. 10, 2011

Related U.S. Application Data (60) Division of application No. 11/561,536, filed on Nov. 20, 2006, now Pat. No. 7,843,621, which is a continuation-in-part of application No. 10/605,024, filed on Sep. 2, 2003, now Pat. No. 7,561,324, and a continuation-in-part of application No. 10/907,065, filed on Mar. 18, 2005, now Pat. No. 7,236,292, which is a division of application No. 10/249,957, filed on May 22, 2003, now Pat. No. 6,982,178.

(60) Provisional application No. 60/597,279, filed on Nov. 21, 2005, provisional application No. 60/744,022, filed on Mar. 31, 2006, provisional application No. 60/319,516, filed on Sep. 3, 2002, provisional application No. 60/319,300, filed on Jun. 10, 2002, provisional application No. 60/320,186, filed on May 12, 2003.

(51) Int. Cl.
*G02B 26/00* (2006.01)
*G02F 1/03* (2006.01)

(52) U.S. Cl.
USPC .......................................... 359/296; 359/245

(58) Field of Classification Search
USPC ................. 359/245, 248, 254, 265–275, 296; 345/107, 105; 204/450, 451, 456, 546, 204/549, 600; 430/32
See application file for complete search history.

(56) References Cited

U.S. PATENT DOCUMENTS

| | | | |
|---|---|---|---|
| 3,391,014 A | 7/1968 | Fauser | |
| 3,668,106 A | 6/1972 | Ota | |

(Continued)

FOREIGN PATENT DOCUMENTS

| | | |
|---|---|---|
| EP | 1099207 B1 | 3/2002 |
| EP | 1145072 B1 | 5/2003 |

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner* — Tuyen Tra
(74) *Attorney, Agent, or Firm* — David J. Cole (57) ABSTRACT

A laminate comprising a solid electro-optic medium and an electrically conductive layer is tested by passing it over a pair of electrodes at different potentials, with the electrically conductive layer lying on the opposed side of the electro-optic medium from the electrodes. An article which can be tested by this method, and which is useful in the manufacture of electro-optic displays, comprises a layer of a solid electro-optic medium and a release sheet comprising an electrically conductive layer.

14 Claims, 2 Drawing Sheets

(56) References Cited

U.S. PATENT DOCUMENTS

| | | | |
|---|---|---|---|
| 3,756,693 | A | 9/1973 | Ota |
| 3,767,392 | A | 10/1973 | Ota |
| 3,772,013 | A | 11/1973 | Wells |
| 3,792,308 | A | 2/1974 | Ota |
| 3,870,517 | A | 3/1975 | Ota et al. |
| 3,892,568 | A | 7/1975 | Ota |
| 3,959,906 | A | 6/1976 | Norris, Jr. et al. |
| 4,093,534 | A | 6/1978 | Carter et al. |
| 4,160,257 | A | 7/1979 | Carrish |
| 4,161,557 | A * | 7/1979 | Suzuki et al. ............... 428/1.61 |
| 4,272,596 | A | 6/1981 | Harbour et al. |
| 4,418,346 | A | 11/1983 | Batchelder |
| 4,522,472 | A | 6/1985 | Liebert et al. |
| 4,550,982 | A | 11/1985 | Hirai |
| 4,602,263 | A | 7/1986 | Borror et al. |
| 4,655,897 | A | 4/1987 | DiSanto et al. |
| 4,681,403 | A | 7/1987 | Te Velde et al. |
| 4,703,573 | A | 11/1987 | Montgomery et al. |
| 4,742,345 | A | 5/1988 | DiSanto et al. |
| 4,746,917 | A | 5/1988 | DiSanto et al. |
| 4,902,108 | A | 2/1990 | Byker |
| 5,250,938 | A | 10/1993 | DiSanto et al. |
| 5,276,438 | A | 1/1994 | DiSanto et al. |
| 5,288,433 | A | 2/1994 | Stevens |
| 5,293,528 | A | 3/1994 | DiSanto et al. |
| 5,378,404 | A | 1/1995 | Han et al. |
| 5,402,145 | A | 3/1995 | DiSanto et al. |
| 5,412,398 | A | 5/1995 | DiSanto et al. |
| 5,467,107 | A | 11/1995 | DiSanto et al. |
| 5,484,292 | A | 1/1996 | McTaggart |
| 5,485,176 | A | 1/1996 | Ohara et al. |
| 5,548,282 | A | 8/1996 | Escritt et al. |
| 5,561,443 | A | 10/1996 | DiSanto et al. |
| 5,745,094 | A | 4/1998 | Gordon, II et al. |
| 5,760,761 | A | 6/1998 | Sheridon |
| 5,777,782 | A | 7/1998 | Sheridon |
| 5,800,950 | A | 9/1998 | Hirao et al. |
| 5,808,783 | A | 9/1998 | Crowley |
| 5,825,526 | A | 10/1998 | Bommarito et al. |
| 5,872,552 | A | 2/1999 | Gordon, II et al. |
| 5,930,026 | A | 7/1999 | Jacobson et al. |
| 5,961,804 | A | 10/1999 | Jacobson et al. |
| 6,017,584 | A | 1/2000 | Albert et al. |
| 6,025,896 | A | 2/2000 | Hattori et al. |
| 6,054,071 | A | 4/2000 | Mikkelsen, Jr. |
| 6,055,091 | A | 4/2000 | Sheridon et al. |
| 6,067,185 | A | 5/2000 | Albert et al. |
| 6,097,531 | A | 8/2000 | Sheridon |
| 6,105,290 | A | 8/2000 | Coates et al. |
| 6,117,368 | A | 9/2000 | Hou |
| 6,118,426 | A | 9/2000 | Albert et al. |
| 6,120,588 | A | 9/2000 | Jacobson |
| 6,120,839 | A | 9/2000 | Comiskey et al. |
| 6,124,851 | A | 9/2000 | Jacobson |
| 6,128,124 | A | 10/2000 | Silverman |
| 6,130,773 | A | 10/2000 | Jacobson et al. |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,151,153 | A | 11/2000 | Bryan |
| 6,172,798 | B1 | 1/2001 | Albert et al. |
| 6,177,921 | B1 | 1/2001 | Comiskey et al. |
| 6,184,856 | B1 | 2/2001 | Gordon, II et al. |
| 6,204,953 | B1 | 3/2001 | Zieba et al. |
| 6,225,971 | B1 | 5/2001 | Gordon, II et al. |
| 6,232,950 | B1 | 5/2001 | Albert et al. |
| 6,241,921 | B1 | 6/2001 | Jacobson et al. |
| 6,249,271 | B1 | 6/2001 | Albert et al. |
| 6,252,564 | B1 | 6/2001 | Albert et al. |
| 6,262,706 | B1 | 7/2001 | Albert et al. |
| 6,262,833 | B1 | 7/2001 | Loxley et al. |
| 6,271,823 | B1 | 8/2001 | Gordon, II et al. |
| 6,300,932 | B1 | 10/2001 | Albert |
| 6,301,038 | B1 | 10/2001 | Fitzmaurice et al. |
| 6,312,304 | B1 | 11/2001 | Duthaler et al. |
| 6,312,971 | B1 | 11/2001 | Amundson et al. |
| 6,323,989 | B1 | 11/2001 | Jacobson et al. |
| 6,327,072 | B1 | 12/2001 | Comiskey et al. |
| 6,330,054 | B1 | 12/2001 | Ikami |
| 6,337,761 | B1 | 1/2002 | Rogers et al. |
| 6,376,828 | B1 | 4/2002 | Comiskey |
| 6,377,387 | B1 | 4/2002 | Duthaler et al. |
| 6,392,785 | B1 | 5/2002 | Albert et al. |
| 6,392,786 | B1 | 5/2002 | Albert |
| 6,400,492 | B1 | 6/2002 | Morita et al. |
| 6,413,790 | B1 | 7/2002 | Duthaler et al. |
| 6,422,687 | B1 | 7/2002 | Jacobson |
| 6,445,374 | B2 | 9/2002 | Albert et al. |
| 6,445,489 | B1 | 9/2002 | Jacobson et al. |
| 6,459,418 | B1 | 10/2002 | Comiskey et al. |
| 6,473,072 | B1 | 10/2002 | Comiskey et al. |
| 6,480,182 | B2 | 11/2002 | Turner et al. |
| 6,498,114 | B1 | 12/2002 | Amundson et al. |
| 6,504,524 | B1 | 1/2003 | Gates et al. |
| 6,506,438 | B2 | 1/2003 | Duthaler et al. |
| 6,512,354 | B2 | 1/2003 | Jacobson et al. |
| 6,515,649 | B1 | 2/2003 | Albert et al. |
| 6,515,790 | B2 | 2/2003 | Miyamoto et al. |
| 6,518,949 | B2 | 2/2003 | Drzaic |
| 6,521,489 | B2 | 2/2003 | Duthaler et al. |
| 6,531,997 | B1 | 3/2003 | Gates et al. |
| 6,535,197 | B1 | 3/2003 | Comiskey et al. |
| 6,538,801 | B2 | 3/2003 | Jacobson et al. |
| 6,545,291 | B1 | 4/2003 | Amundson et al. |
| 6,580,545 | B2 | 6/2003 | Morrison et al. |
| 6,639,578 | B1 | 10/2003 | Comiskey et al. |
| 6,652,075 | B2 | 11/2003 | Jacobson |
| 6,657,772 | B2 | 12/2003 | Loxley |
| 6,661,563 | B2 | 12/2003 | Hayashi et al. |
| 6,664,944 | B1 | 12/2003 | Albert et al. |
| 6,671,030 | B2 | 12/2003 | Gyoda |
| D485,294 | S | 1/2004 | Albert |
| 6,672,921 | B1 | 1/2004 | Liang et al. |
| 6,680,517 | B2 | 1/2004 | Namba |
| 6,680,725 | B1 | 1/2004 | Jacobson |
| 6,683,333 | B2 | 1/2004 | Kazlas et al. |
| 6,693,620 | B1 | 2/2004 | Herb et al. |
| 6,704,133 | B2 | 3/2004 | Gates et al. |
| 6,710,540 | B1 | 3/2004 | Albert et al. |
| 6,721,083 | B2 | 4/2004 | Jacobson et al. |
| 6,723,392 | B1 | 4/2004 | Jinnai et al. |
| 6,724,519 | B1 | 4/2004 | Comiskey et al. |
| 6,727,881 | B1 | 4/2004 | Albert et al. |
| 6,731,367 | B1 | 5/2004 | Saitoh |
| 6,738,050 | B2 | 5/2004 | Comiskey et al. |
| 6,750,473 | B2 | 6/2004 | Amundson et al. |
| 6,750,844 | B2 | 6/2004 | Nakanishi |
| 6,753,999 | B2 | 6/2004 | Zehner et al. |
| 6,788,449 | B2 | 9/2004 | Liang et al. |
| 6,816,147 | B2 | 11/2004 | Albert |
| 6,819,471 | B2 | 11/2004 | Amundson et al. |
| 6,822,782 | B2 | 11/2004 | Honeyman et al. |
| 6,825,068 | B2 | 11/2004 | Denis et al. |
| 6,825,829 | B1 | 11/2004 | Albert et al. |
| 6,825,970 | B2 | 11/2004 | Goenaga et al. |
| 6,831,769 | B2 * | 12/2004 | Holman et al. ............... 359/296 |
| 6,839,158 | B2 | 1/2005 | Albert et al. |
| 6,842,167 | B2 | 1/2005 | Albert et al. |
| 6,842,279 | B2 | 1/2005 | Amundson |
| 6,842,657 | B1 | 1/2005 | Drzaic et al. |
| 6,845,184 | B1 | 1/2005 | Yoshimura et al. |
| 6,859,247 | B2 | 2/2005 | Murade et al. |
| 6,864,875 | B2 | 3/2005 | Drzaic et al. |
| 6,865,010 | B2 | 3/2005 | Duthaler et al. |
| 6,866,760 | B2 | 3/2005 | Paolini Jr. et al. |
| 6,870,657 | B1 | 3/2005 | Fitzmaurice et al. |
| 6,870,661 | B2 | 3/2005 | Pullen et al. |
| 6,891,672 | B2 | 5/2005 | Whitehead et al. |
| 6,900,851 | B2 | 5/2005 | Morrison et al. |
| 6,922,276 | B2 | 7/2005 | Zhang et al. |
| 6,950,220 | B2 | 9/2005 | Abramson et al. |
| 6,958,848 | B2 | 10/2005 | Cao et al. |
| 6,967,640 | B2 | 11/2005 | Albert et al. |

(56) References Cited

U.S. PATENT DOCUMENTS

| | | |
|---|---|---|
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,583 B2 | 3/2006 | Toro-Lira et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 2001/0055000 A1 | 12/2001 | Kanae et al. |
| 2002/0060321 A1 | 5/2002 | Kazlas et al. |
| 2002/0090980 A1 | 7/2002 | Wilcox et al. |
| 2002/0106874 A1 | 8/2002 | Iwane et al. |
| 2003/0102858 A1 | 6/2003 | Jacobson et al. |
| 2003/0179436 A1 | 9/2003 | Liang et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0024353 A1 | 2/2005 | Amundson et al. |
| 2005/0062714 A1 | 3/2005 | Zehner et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0212747 A1 | 9/2005 | Amundson |
| 2005/0253777 A1 | 11/2005 | Zehner et al. |
| 2005/0259068 A1 | 11/2005 | Nihei et al. |
| 2005/0270261 A1 | 12/2005 | Danner et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0035532 A1 | 2/2007 | Amundson et al. |
| 2007/0035808 A1 | 2/2007 | Amundson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0091417 A1 | 4/2007 | Cao et al. |
| 2007/0091418 A1 | 4/2007 | Danner et al. |
| 2007/0103427 A1 | 5/2007 | Zhou et al. |
| 2007/0109219 A1 | 5/2007 | Whitesides et al. |
| 2007/0211002 A1 | 9/2007 | Zehner et al. |
| 2007/0285385 A1 | 12/2007 | Albert et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0074730 A1 | 3/2008 | Cao et al. |
| 2008/0129667 A1 | 6/2008 | Zehner et al. |
| 2008/0136774 A1 | 6/2008 | Harris et al. |
| 2008/0150888 A1 | 6/2008 | Albert et al. |
| 2008/0211765 A1 | 9/2008 | Comiskey et al. |
| 2008/0218839 A1 | 9/2008 | Paolini, Jr. et al. |
| 2008/0266245 A1 | 10/2008 | Wilcox et al. |
| 2008/0291129 A1 | 11/2008 | Harris et al. |

FOREIGN PATENT DOCUMENTS

| | | | |
|---|---|---|---|
| JP | 57-7207222 | * 12/1982 | ................ G02F 1/03 |
| JP | 62-269124 A | 11/1987 | |
| JP | 64-086116 | 3/1989 | |

(56) References Cited

FOREIGN PATENT DOCUMENTS

| | | |
|---|---|---|
| JP | 01-267525 A | 10/1989 |
| JP | 02-284125 A | 11/1990 |
| JP | 03-168613 | 7/1991 |
| JP | 08-278491 | 10/1996 |
| JP | 10-149118 A | 6/1998 |
| JP | 2002-098945 | 4/2002 |
| WO | WO 82/02961 | 9/1982 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 01/92359 | 12/2001 |
| WO | WO 2004/079442 | 9/2004 |

OTHER PUBLICATIONS

Amundson, K., et al. "Flexible, Active-Matrix Display Constructed Using a Microencapsulated Electrophoretic Material and an Organic-Semiconductor-Based Backplane", SID 01 Digest, 160 (Jun. 2001).
Au, J. et al., "Ultra-Thin 3.1-in. Active-Matrix Electronic Ink Display for Mobile Devices", IDW'02, 223 (2002).
Bach, U., et al., "Nanomaterials-Based Electrochromics for Paper-Quality Displays", Adv. Mater, 14(11), 845 (2002).
Bouchard, A. et al., "High-Resolution Microencapsulated Electrophoretic Display on Silicon", SID 04 Digest, 651 (2004).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Comiskey, B., et al., "An electrophoretic ink for all-printed reflective electronic displays", Nature, 394, 253 (1998).
Comiskey, B., et al., "Electrophoretic ink: A Printable Display Material", SID 97 Digest (1997), p. 75.
Croucher, M.D., et al., "Electrophoretic Display: Materials as Related to Performance", Photog. Sci. Eng., 25, 80 (1981).
Dalisa, A.L., "Electropohoretic Display Technology", IEEE Trans. Electron Dev., ED-24, 827 (1977).
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaler, G., et al., "Active-Matrix Color Displays Using Electrophoretic Ink and Color Filters", SID 02 Digest, 1374 (2002).
Gates, H. et al., "A5 Sized Electronic Paper Display for Document Viewing", SID 05 Digest, (2005).
Gutcho, M.H., Microcapsules and Microencapsulation Techniques, Noyes Data Corp., Park Ridge NJ, (1976).
Hayes, R.A., et al., "Video-Speed Electronic Paper Based on Electrowetting", Nature, vol. 425, Sep. 25, pp. 383-385 (2003).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Johnson, M. et al., "High Quality Images on Electronic Paper Displays", SID 05 Digest, 1666 (2005).
Kazias, P. et al., "Card-size Active-matrix Electronic Ink Display", Eurodisplay 2002, 259 (2002).
Kazias, P., et al., "12.1" SVGA Microencapsulated Electrophoretic Active Matrix Display for Information Applicances", SID 01 Digest, 152 (Jun. 2001).
Kitamura, T., et al., "Electrical toner movement for electronic paper-like display", Asia Display/IDW '01, p. 1517, Paper HCS1-1 (2001).
O'Regan, B. et al., "A Low Cost, High-efficiency Solar Cell Based on Dye-sensitized colloidal TiO2 Films", Nature, vol. 353, Oct. 24, 1991, 773-740.
Ota, I., et al., "Developments in Electrophoretic Displays", Proceedings of the SID, 18, 243 (1977).
Pitt, M.G., et al., "Power Consumption of microencapsulated Electrophoretic Displays for Smart Handheld Applications", SID 02 Digest, 1378 (2002).
Shiwa, S., et al., "Electrophoretic Display Method Using Ionographic Technology," SID 88 Digest (1988), p. 61.
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).

* cited by examiner

COMPONENTS AND TESTING METHODS FOR USE IN THE PRODUCTION OF ELECTRO-OPTIC DISPLAYS

REFERENCE TO RELATED APPLICATIONS

This application is a division of application Ser. No. 11/561,536, filed Nov. 20, 2006 (Publication No. 2007/0153361, now U.S. Pat. No. 7,843,621, issued Nov. 30, 2010), which itself claims benefit of Application Ser. No. 60/597,279, filed Nov. 21, 2005, and of Application Ser. No. 60/744,022, filed Mar. 31, 2006.

The aforementioned application Ser. No. 11/561,536 is also a continuation-in-part of application Ser. No. 10/605,024, filed Sep. 2, 2003 (Publication No. 2004/0155857, now U.S. Pat. No. 7,561,324, issued Jul. 14, 2009), which claims benefit of Application Ser. No. 60/319,516, filed Sep. 3, 2002. The aforementioned application Ser. No. 11/561,536 is also a continuation-in-part of application Ser. No. 10/907,065, filed Mar. 18, 2005 (Publication No. 2005/0146774, now U.S. Pat. No. 7,236,292, issued Jun. 26, 2007), which is a divisional of application Ser. No. 10/249.957, filed May 22, 2003 (now U.S. Pat. No. 6,982,178), which claims benefit of Application Ser. No. 60/319,300, filed Jun. 10, 2002, and of Application Ser. No. 60/320,186, filed May 12, 2003.

This application is related to:
(a) application Ser. No. 10/904,063, filed Oct. 21, 2004 (now U.S. Pat. No. 7,110,164), which is a continuation-in-part of the aforementioned application Ser. Nos. 10/249,957 and 10/605,024; see also application Ser. No. 11/307,297, filed Jan. 31, 2006 (now U.S. Pat. No. 7,513,813), which is a divisional of the aforementioned application Ser. No. 10/904,063;
(b) application Ser. No. 10/145,861, filed May 13, 2002 (now U.S. Pat. No. 6,864,875), which is a continuation of application Ser. No. 09/436,303, filed Nov. 8, 1999 (now abandoned), which is itself a divisional of application Ser. No. 09/289,507, filed Apr. 9, 1999 (now U.S. Pat. No. 7,075,502);
(c) copending application Ser. No. 11/550,114, filed Oct. 17, 2006 (Publication No. 2007/0109219), which claims benefit of Application Ser. No. 60/596,743, filed Oct. 18, 2005 and Application Ser. No. 60/596,799, filed Oct. 21, 2005, and which is a continuation-in-part of the aforementioned application Ser. No. 10/605,024.

The entire contents of these copending applications, and of all other U.S. patents and published and copending applications mentioned below, are herein incorporated by reference.

BACKGROUND OF INVENTION

The present invention relates to components and testing methods for use in the production of electro-optic displays. This invention primarily relates to such components and methods containing an electro-optic medium which is a solid (such media may hereinafter for convenience be referred to as "solid electro-optic media"), in the sense that the electro-optic medium has solid external surfaces, although the medium may, and often does, have internal liquid- or gas-filled spaces, and to methods for assembling displays using such an electro-optic medium. Thus, the term "solid electro-optic displays" includes encapsulated electrophoretic displays, encapsulated liquid crystal displays, and other types of displays discussed below. The components and testing methods of the present invention are particularly, though not exclusively, intended for use in the production of electro-optic displays comprising electrophoretic media, especially encapsulated electrophoretic media.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870.657; and 6,950,220. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,430; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; and 7,119,772; and U.S. Patent Applications Publication Nos. 2002/0060321; 2002/0090980; 2002/0180687; 2003/0011560; 2003/0102858; 2003/0151702; 2003/0222315; 2004/0014265; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0239614; 2004/0257635; 2004/0263947; 2005/0000813; 2005/0007336; 2005/0012980; 2005/0017944; 2005/0018273; 2005/0024353; 2005/0062714; 2005/0067656; 2005/0078099; 2005/0099672; 2005/0122284; 2005/0122306; 2005/0122563; 2005/0122565; 2005/0134554; 2005/0146774; 2005/0151709; 2005/0152018; 2005/0152022; 2005/0156340; 2005/0168799; 2005/0179642; 2005/0190137; 2005/0212747; 2005/0213191; 2005/0219184; 2005/0253777; 2005/0270261; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0198014; 2006/0202949; and 2006/0209388; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, International Application Publication No. WO 02/01281, and published U.S. Application No. 2002/0075556, both assigned to Sipix Imaging, Inc.

Another type of electro-optic display is an electro-wetting display developed by Philips and described in an article in the Sep. 25, 2003 issue of the Journal "Nature" and entitled "Performing Pixels: Moving Images on Electronic Paper". It is shown in U.S. Patent Publication No. 2005/0151709 that such electro-wetting displays can be made bistable.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

Other types of solid electro-optic media, for example encapsulated or polymer-dispersed liquid crystals, can also be used in the present invention.

As discussed at length in the aforementioned U.S. Pat. No. 6,982,178 (see column 3, lines 63 to column 5, line 46), an electro-optic display normally comprises a layer of electro-optic material and at least two other layers disposed on opposed sides of the electro-optic material, one of these two layers being an electrode layer. The manufacture of such an electro-optic display normally involves at least one lamination operation. Although many of the components used in electro-optic displays, and the methods used for their manufacture, are derived from liquid crystal displays (LCD's), the LCD assembly process (which involves flowing liquid crystal between spaced substrates) cannot be transferred to solid electro-optic displays, since the solid electro-optic medium must be secured to layers on both sides and cannot simply be slid between the two surrounding layers. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

The aforementioned U.S. Pat. No. 6,982,178 describes a method of assembling a solid electro-optic display (including a particle-based electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will be typically be a polymeric film, and will normally have a thickness in the range of about 1 to about 25 mil (25 to 634 µm), preferably about 2 to about 10 mil (51 to 254 µm). The electrically-conductive layer is conveniently a thin metal layer of, for example, aluminum or indium-tin-oxide (ITO), or may be a conductive polymer. Polyethylene terephthalate (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Both of these testing methods have disadvantages. The first method requires an electrically conductive layer in the release sheet, and release sheets provided with such conductive layers are substantially more expensive than conventional release sheets which lack such conductive layers. Furthermore, this testing method requires that electrical contact be made with the conductive layer in the release sheet, and although this can readily be done when testing is effected on an isolated piece of front plane laminate (such as the piece clamped in an electrostatic chuck illustrated in the patent— one can simply peel the release sheet away from one corner of the piece to expose the conductive layer) it may be more difficult to do if is desired to test a front plane laminate in the form of a continuous web. In addition, the conductive layers on commercial release sheets incorporating such layers are normally opaque, so providing a release sheet with such an opaque conductive layer prevents visual inspection of one surface of the electro-optic layer in the front plane laminate during the testing.

The apparatus disclosed in the patent for effecting the second, electrostatic method, namely an ionographic print head, may also present problems. It may be difficult to provide sufficient electrostatic charge to ensure uniform switching of the electro-optic medium if the electro-optic medium is of a type (for example, an electrochromic medium) which requires substantial current flow for switching, or if the front plane laminate is in the form of a continuous web moving at substantial speed. It is normally desirable to test the electro-optic medium in both its extreme optical states to ensure detection of any defects which result in a particular area of the front plane laminate failing to switch, and testing both extreme optical states using the electrostatic method requires that a second electrostatic head remove the electrostatic charge applied by a first head and then apply an electrostatic charge of opposite polarity, which imposes further stress upon the ability of the second electrostatic head to apply sufficient charge to the front plane laminate. The presence of certain optional layers, especially anti-static layers, on the front plane laminate may interfere with the electrostatic method. Finally, an ionographic print head or similar electrostatic charge application device may be susceptible to edge effects which may render it difficult to ensure accurate testing of peripheral portions of a front plane laminate, especially the edges of a broad web of such material.

The aforementioned front plane laminate has proved to be very useful for assembly of electro-optic displays, especially flexible displays and displays with one rigid (typically glass) and one flexible substrate. However, a front plane laminate does have certain limitations. Since the FPL is normally produced by coating the electro-optic layer directly on to a substrate which will eventually form the front electrode (and typically an associated front protective layer) of the final display), the front electrode must be a coatable light-transmissive conductor, which restricts the choice of front conductor and protective layer. For example, some possible protective layers, such as glass or thick plastic layers, may be too thick and stiff to allow coating of the electro-optic medium, while other possible substrates may be too fragile for this purpose. Also, since practical mass production requires that the FPL be produced as a continuous web, waste occurs when portions of the web cannot be used because of the sizes and shapes of FPL pieces used to produce displays. As the complexity and cost of the substrate to be coated increases, the cost of the substrate can substantially affect the final cost the display. Moreover, a display production process using an FPL must make provision for establishing electrical contact between the front electrode within the FPL and the backplane, since in practice the backplane is provided with contacts to which are fed the voltages required at the front electrode As described in the aforementioned U.S. Pat. No. 6,982,178, it is necessary either to "clean" the electro-optic medium from one or more portions of the FPL to expose the front electrode layer and allow the necessary contacts to be formed, or to pre-form contact pads on the substrate before the electro-optic medium is coated thereon, the coating being effected so that electro-optic medium is not deposited on the contact pads, or any electro-optic medium deposited being removed later. While in general the use of pre-formed contact pads tends to be more satisfactory, it does have the disadvantage of reducing flexibility in the manufacturing process; since the location of the contact pads varies with the intended application of the FPL, pre-formed contact pads fix the application in which a particular roll of FPL can be used. In some cases where a barrier layer is incorporated into the substrate on which the FPL is formed, it may be necessary to clean a peripheral portion of the FPL to allow an edge seal to be formed. Finally, it is known that some electro-optic media are sensitive to moisture and to the relative humidity of the atmosphere. Accordingly, it is desirable to "condition" the electro-optic medium by allowing it to equilibrate with an atmosphere having standard temperature and relative humidity before the final display is sealed in order to ensure that the display has standardized electro-optic performance. It is difficult to condition an electro-optic medium derived within an FPL after the electro-optic medium has been placed between the front substrate and the lamination adhesive layer since the materials used for both the front substrate and the lamination adhesive are typically impervious to moisture, and this may lead to problems when final display assembly is conducted in poorly controlled environments.

The aforementioned 2004/0155857 describes a so-called "double release film" which is essentially a simplified version of the front plane laminate previously described. One form of the double release film comprises a layer of a solid electro-optic medium sandwiched between two adhesive layers, one or both of the adhesive layers being covered by a release sheet. Another form of the double release film comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release film is laminated to a front electrode to form a front sub-assembly, and then in a second lamination the front sub-assembly is laminated to a backplane to form the final display. Although obviously the electro-optic medium can be tested after the first lamination (since the result of this first lamination is in effect a front plane laminate), it would be desirable to provide some method for testing the double release film prior to the first lamination.

The aforementioned copending application Ser. No. 11/550,114 describes a form of electro-optic display in which a lamination adhesive layer is present between the electro-optic layer and the front electrode through which an observer views the display; a second lamination adhesive layer may or may not be present between the electro-optic layer and the backplane of the display. This copending application also describes a so-called "inverted front plane laminate" which resembles the front plane laminate described in the aforementioned U.S. Pat. No. 8,982,178, but in which the positions of the electro-optic layer and the lamination adhesive layer are reversed, so that the inverted front plane laminate comprises, in order, at least one of a light-transmissive protective layer and a light-transmissive electrically-conductive layer; an adhesive layer; a layer of a solid electro-optic medium; and a release sheet.

The aforementioned copending application Ser. No. 11/550,114 also describes an electro-optic display comprising a front member comprising at least one of a light-transmissive protective layer and a light-transmissive electrically-conductive layer, the front member forming a viewing surface through which an observer views the display, an electro-optic layer; and an adhesive layer disposed between the electro-optic layer and the front member, the front layer having areas of at least two different colors so that the adhesive layer serves as a color filter.

The present invention seeks to provide improved testing methods for front plane laminates, double release films and other sub-assemblies used in the manufacture of electro-optic displays. The present invention also seeks to provide improved double release films, and similar sub-assemblies useful in the manufacture of electro-optic displays, adapted for use in the testing methods of the invention.

SUMMARY OF THE INVENTION

The present invention provides a method for testing a laminate comprising a layer of a solid electro-optic medium having two extreme optical states, and an electrically conductive layer, the method comprising:

passing the laminate over a pair of electrodes maintained at different potentials, the laminate being passed over the electrodes such that during this passage the electrically conductive layer lies on the opposed side of the layer of electro-optic medium from the electrodes, the potential difference between the pair of electrodes being maintained large enough to switch a surface of the electro-optic medium substantially to one of its extreme optical states.

As explained in more detail below, in this testing method the appearance of the electro-optic medium can be observed between the pair of electrodes and/or after passage past both electrodes. This observation can be effected either visually or with a machine vision system, although the latter is generally preferred.

In this testing method of the present invention, after the laminate has passed over the pair or electrodes, the laminate may be passed over a second pair of electrodes maintained at different potentials such that passage of the laminate over the second pair of electrodes causes said surface of the electro-optic medium to switch substantially to its opposed extreme optical state. The pair of electrodes, and the second pair of electrodes when present, may be maintained substantially at +V and −V relative to ground, where V is an arbitrary drive voltage. The or each pair of electrodes may contact a surface of the laminate, or at least one of an air gap and a dielectric layer may be present between the or each pair of electrodes and the laminate.

Also, in the testing method of the present invention, the surface of the electro-optic layer facing the pair of electrodes may be exposed (i.e., not covered by any other layer). Alternatively, the laminate may comprise first and second release sheets disposed on opposed sides of the layer of electro-optic medium, the release sheet on the opposed side of the layer of electro-optic medium from the pair of electrodes comprising the conductive layer. In one preferred testing method of the invention, the laminate comprises, in order: the conductive layer; the layer of electro-optic medium; an adhesive layer; and a release sheet. In another preferred testing method of the invention, the laminate comprises, in order: the conductive layer; an adhesive layer; the layer of electro-optic medium; and a release sheet.

The present testing method may further comprise exposing one surface of the laminate to light, and measuring the amount of light reaching the opposed surface of the laminate.

In another aspect, this invention provides a (second) method for testing a laminate comprising a layer of a solid electro-optic medium having two extreme optical states, and first and second release sheets on opposed sides of the layer of electro-optic medium, each of the release sheets comprising an electrically conductive layer, and at least one of release sheets being light transmissive, the method comprising:

applying between the conductive layers of the two release sheets a potential difference large enough to switch a surface of the electro-optic medium substantially to one of its extreme optical states.

In another aspect, this invention provides an optically inspectable double release optically active film.

In another aspect, this invention provides an article of manufacture (a release film) comprising a layer of a solid electro-optic medium capable of changing its optical state on application of an electric field thereto, and a release sheet, the release sheet comprising an electrically conductive layer.

In one form of this release film, the release sheet is not light transmissive. Another form of the release film further comprises a second release sheet on the opposed side of the layer of electro-optic medium from the (first) release sheet comprising the electrically conductive layer, at least one of the release sheets being light transmissive. Thus, this form of the release sheet is a double release film of the type described in the aforementioned 2004/0155857. The second release sheet may comprise a (second) conductive layer. In one form of the double release film of the present invention, the release sheet comprising the conductive layer is not light transmissive, and the second release sheet is light transmissive. All release films of the present invention may comprise an adhesive layer disposed between the electro-optic layer and one of the release sheets; the double release films of the present invention may have two adhesive layers, one adhesive layer being disposed between the electro-optic layer and each release sheet.

The release films of the present invention may include any of the types of solid electro-optic medium discussed above, including for example polymer dispersed liquid crystal media. More specifically, the present release films may comprise a rotating bichromal member or electrochromic medium. Alternatively, the present release films may comprise an electrophoretic medium having a plurality of electrically charged particles disposed in a fluid and capable of moving through the fluid on application of an electric field to the electro-optic medium. The electrically charged particles and the fluid may be confined within a plurality of closed cavities formed in a substrate; for example, the electrophoretic medium may comprise single type of charged particles having a first color disposed in a dyed liquid having a second color different from the first color, both the particles and dyed liquid being confined within the cavities. Alternatively, the electrically charged particles and the fluid may be confined within a plurality of capsules, or the electrically charged particles and the fluid are present as a plurality of discrete droplets held within a polymeric continuous phase. In all cases, the fluid may be liquid or gaseous.

DETAILED DESCRIPTION

As already indicated, in one aspect this invention provides a method for testing a laminate comprising a layer of a solid electro-optic medium having two extreme optical states, and an electrically conductive layer. The method comprises passing the laminate over a pair of electrodes maintained at different potentials, the laminate being passed over the electrodes such that during this passage the electrically conductive layer lies on the opposed side of the layer of electro-optic medium from the electrodes. The potential difference between the pair of electrodes is maintained large enough to switch the electro-optic medium substantially to one of its extreme optical states. After passage past the electrodes, the switched electro-optic medium can be inspected visually (a term which is used herein to include machine vision) to detect defective areas.

In a preferred form of this method, after being passed over the (first) pair of electrodes, the laminate is passed over a second pair of electrodes, the second pair of electrodes being maintained at different potentials, and the laminate being passed over the second pair of electrodes such that during this passage the electrically conductive layer lies on the opposed side of the layer of electro-optic medium from the second pair of electrodes. The second pair of electrodes are arranged so that after passage across them, the electro-optic medium is substantially in its opposed extreme optical state from the extreme optical state in which it was left after passage over the first pair of electrodes. The switched electro-optic medium can then again be inspected visually. This preferred method is designed to detect all non-switching or improperly switching areas of the electro-optic medium. For example, if in a black/white electro-optic medium a defective area stays black and refuses to switch to white, and the first pair of electrodes is arranged to drive the electro-optic medium to black, the defective area will not be apparent on the first inspection. However, the second pair of electrodes will be arranged to drive the electro-optic medium to white, so that the defective area will readily be apparent on the second inspection.

Switching of an electro-optic medium requires that an electric field be applied to the medium; in practice, since the electro-optic medium is normally present in the form of a thin layer, the electric field is applied perpendicular to the plane of the layer. In normal operation of an electro-optic display, and in the testing methods described in the aforementioned U.S. Pat. No. 6,892,178, a unidirectional electric field is applied between two electrodes provided on opposed sides the electro-optic medium, except that in the electrostatic testing method, application of static charge to a (dielectric) release sheet in effect converts that release sheet into one of the electrodes. However, in the present method a pair of electrodes at different potentials are arranged on one side of the electro-optic medium and a conductive layer is provided on the opposed side. As will readily be apparent to those skilled in electrostatics, the conductive layer acts as a common plane which will assume a potential intermediate the potentials of the two electrodes, so that an electric field in one direction will exist between one of the pair of electrodes and the conductive layer, while an electric field in the opposed direction will exist between the other electrode and the conductive layer. Thus, as the laminate passes the pair of electrodes, the electro-optic medium first experiences an electric field in one direction, rapidly followed by an electric field in the opposed direction. The final state of the electro-optic medium depends upon the last electric field applied. Thus, in the preferred form of the present method using two pairs of electrodes, the order of the electrodes along the direction of motion of the laminate should be reversed between the two pairs of electrodes to ensure that the electro-optic medium is switched to its two extreme optical states. For example, it the first pair comprises a positive electrode followed by a negative electrode, the second pair should have a negative electrode followed by a positive electrode.

In principle, provided a sufficient potential difference exists between the two electrodes, the absolute potential of the electrodes is irrelevant. However, in most cases it is desirably to keep the conductive layer substantially at ground potential in order to prevent electrostatic discharge to any conductors (for example, drive rollers) with which the conductive layer may come into contact. For this purpose, it is desirable to have the pair of electrodes maintained at potentials of substantially ±V, where V is an arbitrary drive voltage. The magnitude of V will vary with the particular laminate being tested, including any layers present between the electrodes and the electro-optic medium (for example, any air gap between the electrodes and the laminate), and between the electro-optic medium and the conducting layer. The optimum drive voltage may readily be determined empirically. However, by way of general guidance it may be noted that for typical encapsulated electrophoretic front plane laminates similar to those described in the aforementioned U.S. Pat. No. 6,892,178, drive voltages in the range of about ±1500 V appear satisfactory. The voltage and current used should be controlled to minimize any adverse effects on the subsequent performance of the electro-optic medium, since some electro-optic media can be damaged by application of excessive voltages and/or currents. It is normally desirable to neutralize any remaining charges on the laminate after the observations needed to detect defective areas have been completed and those skilled in electrostatics will be aware of appropriate apparatus for such destating.

In most cases, the electrodes used in the present method operate by applying an electrostatic charge to the laminate being tested. It is not essential that the electrodes actually contact the laminate; an air gap or a dielectric layer (for example, a polymeric film or sheet) may be present between the electrodes and the laminate. Good results have been obtained with flat electrodes embedded in an insulating material in an inter-meshed comb fashion, with or without a plastic sheet between the electrodes and the laminate. The electrodes may slide or roll over the laminate. The electrodes may also serve some function other than that of electrodes. For example, the electrodes could also serve as drive rollers. Alternatively, the electrodes could be in the form of a special surface roll with alternating dipoles. In some cases, depending upon the conductivity of the conductive layer in the laminate being tested, it may be possible to test both extreme optical states of a laminate using only one pair of electrodes. For example, if a pair of roller electrodes can be spaced far enough apart to allow a camera system to image the laminate between the two electrodes, one extreme optical state of the laminate can be observed between the two electrodes and the opposed extreme optical state "downstream" of the second electrode. Electrodes can also be made transparent if necessary. To avoid edge effects, it may be desirable to make the electrodes slightly wider than the laminate.

The present method can be practiced by observing one or both surfaces of the laminate. Thus, in the present invention the conductive layer can be opaque, with the observations of the changes in the optical state of the medium made only from the electrodes side of the laminate. The ability of the present method to use only a single opaque conductive layer is an important advantage, since opaque conductive layers tend to be much less expensive than light transmissive ones. For example, aluminized sheets of poly(ethylene terephthalate) (PET) are readily available commercially and are about two orders of magnitude cheaper than a similar transparent indium-tin-oxide on PET film. Obviously, where the conductive layer in the laminate is to form the common front electrode in the final display, it is necessary that the conductive layer be at least light transmissive, but where the conductive layer will not form part of the final display, the ability of the present method to use opaque conductive layers can provide substantial cost savings.

The present testing method can be used to test laminates comprising only an electro-optic layer and a conductive layer, although in practice, given the very thin conductive layers typically used, the electrode layer will usually be present on some form of carrier, for example a polymeric film. Indeed, it has been found experimentally that the present method gives good results when applied to a coating of an encapsulated electrophoretic medium on a substrate containing a conductive layer. As discussed in the aforementioned U.S. Pat. No. 6,892,178, such electro-optic-medium-on-substrate sub-assemblies are typically produced at an intermediate stage in the production of a front plane laminate, before the lamination adhesive is applied over the electro-optic medium, and testing of such sub-assemblies may be useful in giving early warning of problems in the coating of the electro-optic medium. The prior art testing processes described in this patent do not provide any means for testing such sub-assemblies.

The testing method of the present invention can also be used to test a variety of laminates and sub-assemblies useful in the construction of electro-optic displays. For example, the testing method may be used to test front plane laminates, in which case the electrodes are passed over the release sheet side of the front plane laminate. The front plane laminate may be of the original type described in the aforementioned U.S. Pat. No. 6,982,178 or of the inverted type described in the aforementioned copending application Ser. No. 11/550,114, filed Oct. 17, 2006. It should be noted that, when a front plane laminate is to be tested by the present method, no conductive layer should be present in the release sheet, since such a conductive layer would prevent the electric field penetrating the electro-optic medium. (Indeed, in any method of the present invention care should be taken to ensure that no conductive layer is present between the electrodes and the electro-optic medium or the method may fail.) Accordingly, the present methods enables a much simpler and cheaper release sheet to be used than the prior art method which requires a conductive layer in the release sheet.

The method of the present invention may also be used to test double release films provided that the, or one of the, release sheets comprises a conductive layer. Such a conductive layer can act in a manner exactly similar to the conductive layer of a front plane laminate. Thus, when using the present method to test a double release film, the electrodes are passed over the surface of the double release film on the opposed side of the electro-optic medium from the conductive layer. As previously discussed, if the conductive layer is opaque, observation of the double release film to detect defective areas may have to be conducted from the same side of the double release film as the electrodes.

Defective areas located by the present method may be physically marked. For example, a print head capable of marking defective areas with a suitable (typically red) marking ink may be disposed downstream of the electrodes and observation point to mark defective areas. Alternatively, the location of the defective areas may simply be recorded (typically with reference to markings provided for this purpose on the laminate), and defective area data shipped with the roll to a later processor to ensure that the defective areas are not used.

As already indicated, in the present testing method, no conductive layer should be present between the electrodes and the electro-optic layer of the structure being tested, since obviously such a conductive layer would itself provide a conductive path between the electrodes so that no substantial electric field would exist across the electro-optic layer, and this layer would not switch. Even when no truly conductive layer is present between the electrodes and the electro-optic layer, however, it is still necessary to consider the thicknesses and resistivities of the layers present between the electrodes and the electro-optic layer. For example, when the present method is applied to a double release film, it is generally advisable to avoid the use of a relatively thick release sheet of high resistivity between the electrodes and the electro-optic layer, since in such circumstances much of the voltage drop between the electrodes may occur within the release sheet, and it may be difficult to provide enough electric field to ensure rapid switching of the electro-optic medium. Difficulties may also be encountered if a "relatively" conductive layer is present between the electrodes and the electro-optic layer even if the relatively conductive layer has a resistivity such that it would normally be considered an insulator. In particular, difficulties may be encountered in the present method if a highly doped adhesive layer (such as those described in the aforementioned U.S. Pat. No. 7,012,735) is present between the electrodes and the electro-optic layer, since such an adhesive layer may tend to cause the electric field to pass through the adhesive layer rather than through the electro-optic layer.

The method of the present invention may combined with transmission inspection (i.e., determination of the amount of light passing through the laminate). Such transmission inspection may be useful in detecting grain or defects in capsule packing in an encapsulated electrophoretic medium.

Figure 1:
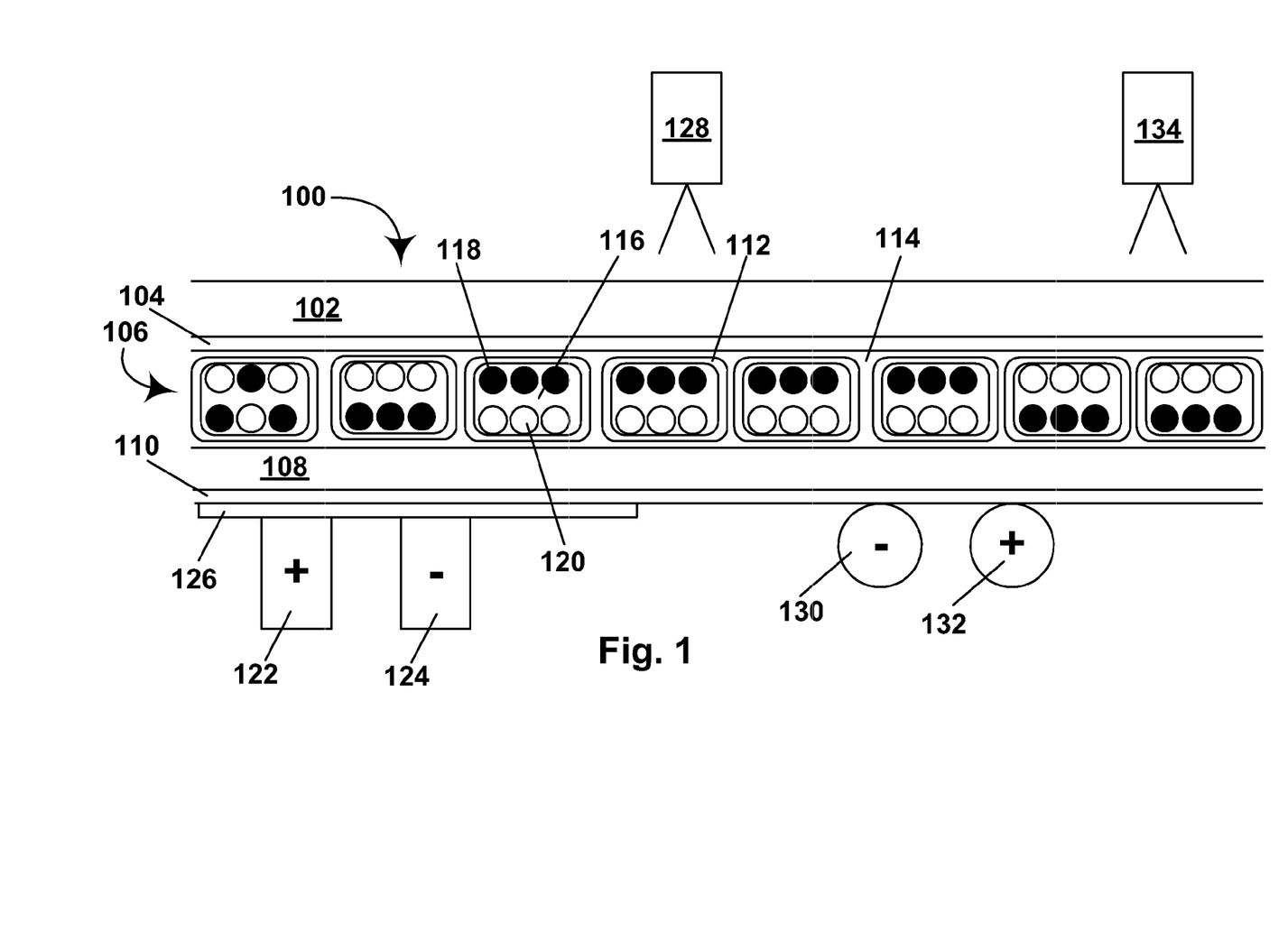
FIG. 1 of the accompanying drawings is a schematic side elevation of a double release film being tested by a testing method of the present invention.

FIG. 1 of the accompanying drawings is a schematic side elevation of apparatus carrying out a preferred method of the present invention on a web of laminate. This laminate is a front plane laminate (generally designated 100) comprising a front substrate 102 formed of a polymeric film, a conductive layer 104, which may be formed of indium tin oxide, an electro-optic layer (generally designated 106), an adhesive layer 108 and a release sheet 110. Although other types of electro-optic medium can of course be used in the present process, the electro-optic layer 106 is illustrated in FIG. 1 as an encapsulated electrophoretic medium comprising capsules 112 held within a polymeric binder 114. The capsules 112 contain a fluid 116, negatively charged black electrophoretic particles 118 and positively charged white electrophoretic particles 120. (FIG. 1 is not to scale. In particular, for ease of illustration the thickness of the laminate 100 is greatly exaggerated relative to the sizes of the electrodes, and the size of the capsules 112 is exaggerated relative the thickness of the laminate 100.)

The front plane laminate 100 in web form is fed (from left to right as illustrated in the Figure) past a first pair of electrodes 122, 124 which are maintained at, respectively +1500 V and −1500 V, the laminate 100 being separated from the electrodes 122, 124 by a clear polymeric sheet 126, which can be omitted if desired. The electrodes 122, 124 are illustrated as being flat electrodes, over which the laminate 100 can slide if the sheet 126 is omitted. The high voltages on the electrodes 122, 124 produce strong electric fields between these electrodes and the conductive layer 104. As illustrated in FIG. 1, the electro-optic layer 106 is first driven to its white extreme optical state (as seen through the front substrate 102, which corresponds to the viewing surface of the display which will eventually be produced from the front plane laminate 100) by the electrode 122 and then to its black extreme optical state by the electrode 124. A line scan camera 128 is positioned above the laminate 100 downstream from the electrode 124 (i.e., such that the laminate 100 passes the camera 128 after passing the electrode 124) and inspects the black optical state of the laminate 100.

After passing the camera 128, the laminate 100 passes over a second pair of electrodes 130, 132, which are illustrated as being in the form of drive rollers used to move the web of laminate 100. The electrodes 130 and 132 are maintained at −1500 V and +1500 V respectively, so that the electrode 132 drives the electro-optic layer 106 to its white extreme optical state. The laminate 100 then passes a second line scan camera 134, which inspects the white optical state of the laminate 100.

As already indicated, in another aspect this invention provides a number of laminates and sub-assemblies useful in the construction of electro-optic displays, most of these laminates and sub-assemblies being capable of testing by the method of the present invention. Broadly speaking, this invention provides an article of manufacture (a release film) comprising a layer a solid electro-optic medium, and a release sheet, the release sheet comprising an electrically conductive layer. As will readily be apparent from the foregoing description, such a release film can be tested by the method of the present invention by passing it over the electrodes with the conductive layer on the opposed side of the electro-optic layer from the electrodes. For reasons already explained, the release sheet need not be light transmissive.

Although the present invention includes the aforementioned single release film in which only one surface of the electro-optic layer may be covered by a release sheet, this leaves one surface of the (typically somewhat fragile) electro-optic medium exposed and subject to damage during normal handling. Accordingly, it is preferred that the release film be in the form of an optically inspectable double release optically active film. Such a film will typically comprise a second release sheet on the opposed side of the layer of electro-optic medium from the release sheet containing the conductive layer. To allow inspection of the changes in the optical state of the electro-optic medium, at least one of the release sheets should be light transmissive. One release sheet may contain a conductive layer and be light transmissive, in which case the properties of the other release sheet are essentially irrelevant. However, for economic reasons, it will typically be preferred to have one release sheet contain an opaque conductive layer and the other release sheet be light transmissive, since as mentioned above release sheets containing opaque conductive layers and clear but non-conductive release sheets are both much less expensive than release sheets containing light transmissive conductive layers.

This invention also provides a double release film which, while it is not useful in the testing method of the present invention can be tested in a manner generally similar to the first method for testing front plane laminate described in the aforementioned U.S. Pat. No. 6,982,178. This form of double release film has conductive layers in both of the release sheets, and at least one of the release sheets (including its conductive layer) is light transmissive. It will readily be apparent that, by placing different voltages on the two conductive layers of such a double release film, its electro-optic medium can be switched and observed in a manner directly analogous to the first method for testing front plane laminate described in the aforementioned U.S. Pat. No. 6,982,178.

Figure 2:
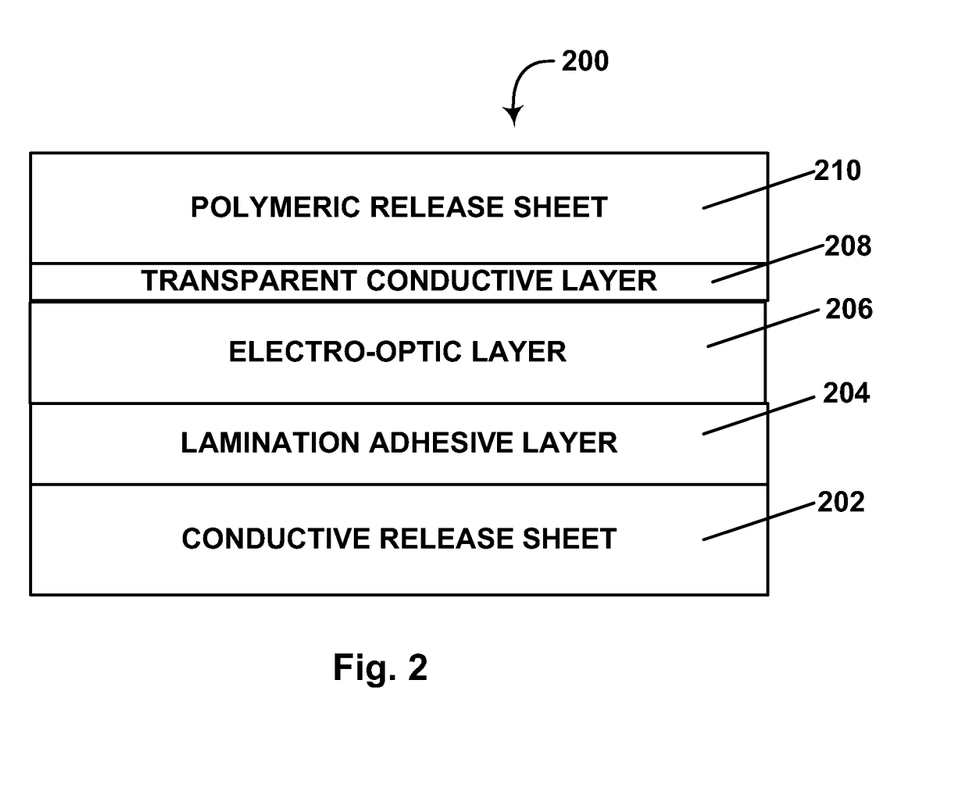
FIG. 2 is a schematic section through a preferred double release film of the present invention, the shading lines being omitted to allow the various layers of the double release film to be labeled.

A cross-section through a double release film of this type is shown in a highly schematic manner in FIG. 2 of the accompanying drawings, in which the relative thicknesses of the various layers are not to scale but are distorted for ease of illustration. This double release film (generally designated 200) comprises a conductive release sheet 202, a lamination adhesive layer 204, and an electro-optic layer 206, which may be of any of the types discussed above. The double release film 200 further comprises a light transmissive electrically-conductive release sheet, which is shown as comprising a transparent conductive layer 208 and a release 210; this is the most common configuration for a transparent release sheet, since the release sheet can conveniently be formed from a commercial product, such as the ITO/PET or aluminized polymeric films. However, the layers 208 and 210 could be replaced by a single layer, for example a layer of a light transmissive electrically-conductive polymer, such a conductive polythiophene. The conductive release sheet 202 may comprise a single layer, for example a layer of polymer doped with sufficient conductive particles (typically metal or carbon black particles) to render it electrically conductive, or a metal foil. It should be noted that, given that the volume resistivities of most electro-optic layers are of the order of $10^{10}$ ohms, while the volume resistivities of lamination adhesives are of the same order of magnitude, the release sheets do not need to have high conductivities to permit testing of the double release film as described below.

As will readily be apparent from the foregoing description and from the aforementioned 2004/0155857, numerous changes can be made in the double release film of the present invention shown in FIG. 2. For example, the positions of the electro-optic layer 206 and the lamination adhesive layer 204 could be reversed (or, which amounts to the same thing, the positions of the two release sheets could be reversed). A second lamination adhesive layer could be provided between the electro-optic layer 206 and the transparent conductive layer 208. Alternatively, where the double release film is intended to be used with other sub-assemblies which incorporate lamination adhesive layers, or where the electro-optic layer 206 itself includes a component (such as a polymeric binder) which can serve as a lamination adhesive layer, the lamination adhesive layer 204 may be omitted. In this case, the conductive release sheet 202 may have a structure similar to that of the release 208/210 and comprise a thin conductive layer on a light-transmissive support, so that both surfaces of the electro-optic layer 204 are available for inspection.

As will also readily be apparent from the description herein and from the aforementioned 2004/0155857, the double release films of the present invention are intended to be used in a double lamination process which requires that the two release sheets 202 and 208/210 be detached during different steps of the process. The release sheets should of course be capable of being peeled from their underlying layers without damage to these underlying layers, and the release sheet which is intended to be removed first should have a lower peel strength than the other release sheet. Those skilled in release sheet technology will be aware that providing appropriate release sheets to meet these constraints is well within the level of skill in the art, and will be familiar with various conventional techniques, such as the use of thin coatings of low surface energy materials (for example, silicones) which can be used to adjust the peel strength of the release sheets.

The release films of the present invention can be used in the manufacture of electro-optic displays by processes similar to those described in the aforementioned 2004/0155857 and U.S. Pat. No. 7,110,164. Typically, the electro-optic layer is coated or otherwise deposited directly on to the second release sheet. Separately, the lamination adhesive layer is coated on to the first release sheet, and then the two coated release sheets are laminated together, typically under heat and pressure, to form a final double release film. The only variant of the double release film which calls for a significant modification of this process is that in which lamination adhesive layers are present on both surfaces of the electro-optic layer. In theory, this type of double release film could be produced by coating the electro-optic layer on to a release sheet already bearing a layer of lamination adhesive. However, in practice the surface properties of most lamination adhesives are such that it may be difficult or impossible to obtain a high quality coating on an adhesive-coated substrate. Accordingly, a double adhesive layer double release film will typically be prepared by coating the electro-optic layer on a sacrificial substrate, coating the two adhesive layers on to the two release sheets to be present in the final double release film, laminating the electro-optic layer and one adhesive layer together, removing the sacrificial substrate from the electro-optic layer, and finally laminating the exposed surface of the electro-optic layer to the second adhesive layer to form the final double release film.

In commercial use, the production and testing of a double release film such as that shown in FIG. 2 will typically be effected using a roll-to-roll process, with defective areas of the double release film being marked on the roll so that such defective areas can be cut from the roll and discarded before the roll is divided to form the portions of double release film needed to form individual displays. However, obviously testing of the double release film can if desired by conducted on separated portions of the double release film.

As already indicated, the double release films of the present invention are intended for use in a double lamination process identical in principle to that described in the aforementioned 2004/0155587. In such a process, one release sheet (typically the second release sheet) is peeled from the double release film and the remaining layers laminated, in any known manner, to a front substrate of a display, which will typically include a front electrode, and may include a color filter array. If a lamination adhesive layer is necessary for proper lamination, this adhesive layer may be provided on the front substrate or (as already described) as a second lamination layer within the double release film, or after removal of the second release sheet, the remaining layers of the double release film may be laminated to a layer of lamination adhesive carried on a third release sheet, which is removed after this lamination and the resultant sub-assembly thereafter laminated to the front substrate. In some cases, however, depending upon the nature of the electro-optic layer itself, no lamination adhesive may be required between the electro-optic layer and the front substrate.

After this first lamination, the first release sheet can be removed from the sub-assembly produced, thus exposing the lamination adhesive layer derived from the double release film, and the sub-assembly laminated to a backplane or similar device containing one or more electrodes for applying an electric field to the electro-optic layer. Obviously, if the double release film of the invention is of a type lacking an adhesive layer between the first release sheet and the electro-optic layer, an intermediate lamination of the electro-optic layer to a lamination adhesive layer carried on a sacrificial sheet may be effected to provide a lamination adhesive layer overlying the electro-optic layer. Alternatively, an adhesive layer could be provided on the backplane. In other cases, the lamination to the backplane or similar device might be effected without the use of a lamination adhesive.

It will readily be apparent to those skilled in the art that, in the process described above, the two lamination operations could be reversed in sequence (i.e., the lamination to the backplane could precede that to the front substrate). Also, the choice of which release sheet is removed before each lamination is to some extent arbitrary and could be reversed if desired.

As will readily be apparent to those skilled in the technology of electro-optic displays, the displays produced from release films of the present invention may incorporate any of the optional features of prior art electro-optic displays described in the aforementioned U.S. Pat. Nos. 6,982,178, and 7,110,164 and Publication Nos. 2005/0146774 and 2004/0155857. Thus, for example, these displays may incorporate any of the various conductive vias, edge seals, protective layers and other optional features described in these patents and published applications.

The double release film of the invention greatly alleviates the problems associated the choice of front substrate and potential waste of front substrate in a front plane laminate, as discussed above. In the present double release film, the choice of the transparent conductive release sheet (and indeed of both release sheets) can be made based on manufacturability, cost, uniformity of coating, etc. This choice allows the cost and functionality of the final front substrate of the display to be separated from the coating/cutting steps. Furthermore, the use of a double release film of the present invention allows the final front substrate to be selected for properties such as water/oxygen barriers, ultra-violet filters, color, etc. The front substrate can be extremely thin, and such thin substrates would prove difficult to coat/handle in manufacturing. The final front substrate can alternatively be a stiff substrate, even glass or a glass color filter array. If an FPL were used, such a complex front substrate would be very expensive, and coating on to this substrate directly would result in a large amount of waste during the coating/cutting process. In the case of a glass final front substrate, the coating would have to be done in a patch coating process, which is difficult to manufacture.

The use of a double release film of the present invention also alleviates the problems discussed above with establishing an electrical connection to the front electrode of the final display. To produce a display with a continuous top plane electrode, the present process need only apply electro-optic medium to the active display area, so that there is no need to clean an area to provide a connection to the top plane electrode (because electro-optic medium is never coated on this electrode as in the FPL manufacturing process). Silver pad printing for the top plane electrode connection may not be required. Finally, in many FPL-based displays, the edge seal is provided by filling the gap between the backplane and the front barrier with epoxy or polymer, as described in the aforementioned U.S. Pat. No. 6,982,178. The effectiveness of this edge seal requires a clean surface for the edge seal compound to bond to on the front substrate side. By arranging the size of the transparent, conducting front electrode/barrier structure to be slightly larger than the double release film and by laminating these two layers in a fashion such that they are aligned, then a clean surface for applying the edge seal material and top plane connection are preserved. The result of using a double release film and an integrated transparent-conductive electrode/moisture-oxygen barrier/UV-layer as a front substrate is a new type of product where the barrier structure is incorporated and the edge seal is cleaned and ready for customer use.

The double release film of the present invention also alleviates the problems with conditioning of an electro-optic medium discussed above. As already noted, the preferred materials for use in FPL's are good moisture barriers so that it is difficult to condition the electro-optic medium within an FPL within a reasonable time to allow greater uniformity in manufacturing output. In contrast, in the double release films of the invention, other materials that are semi-transparent conductors can be used as the release sheets to allow moisture to penetrate the double release film and the display more quickly. For example, some transparent organic coatings are 70-85% transparent, and while these coatings might make poor front substrates in a final display, they are inexpensive, sufficiently transparent to permit inspection of the electro-optic layer during testing, and allow moisture into the double release film for conditioning. Being able to use these types of films for the intermediate manufacturing steps then transferring to the final optical grade front electrode improves the quality of the display derived from the double release film.

In summary, the release films of the present invention provide an important combination of advantages in the manufacture of electro-optic displays. In the case of flexible displays, achieving a very thin display is a key factor. A transfer process using the double release film does not require coating on very thin substrates because the electro-optic layer can be transferred to the thin substrate from a thicker substrate on which it can be readily coated. The front plane stack may be quite complicated and expensive, requiring excellent manufacturing yields to avoid costly work in process losses. The double release film of the present invention with the electro-optic layer coated directly on to a transparent conductive release sheet allows flexibility in the manufacturing process, such as allowing coating on a substrate of intermediate transparency, low cost, and thickness chosen for ease of handling and uniformity. By not having to provide conductive pads at specific locations, it is possible to have electro-optic layers of arbitrary shape cut from continuous rolls of double release film. Inspection can still be accomplished using a film of the present invention provided with a transparent conductive release. The present process enhances manufacturability by not requiring cleaning of top plane connections. The present process also enhances manufacturability by not requiring cleaning of under-fill edge seals currently required for high temperature/high relative humidity applications.

Finally, the present double release film allows certain types of conductive release sheets that may be inappropriate for final displays (organic conductors as one example) to be used to facilitate humidity conditioning of electro-optic layers to reduce variability in product output.

The various articles of manufacture provided by the present invention may be used in any application in which similar prior art articles of manufacture have been used. Thus, for example, the present articles of manufacture may be used in electronic book readers, portable computers, tablet computers, cellular telephones, smart cards, signs, watches, shelf labels and flash drives, and the present invention extends to all these products incorporating or produced with articles of manufacture of the present invention.

Numerous changes and modifications can be made in the preferred embodiments of the present invention already described without departing from the scope of the invention. Accordingly, the foregoing description is to be construed in an illustrative and not in a limitative sense.

The invention claimed is:

1. An article of manufacture comprising a layer of a solid electro-optic medium operable for changing its optical state on application of an electric field thereto, a first release sheet disposed on one surface of the layer of solid electro-optic medium, the first release sheet being peelable from the layer of solid electro-optic medium, the first release sheet comprising an electrically conductive layer, and a second release sheet on the opposed side of the layer of electro-optic medium from the first release sheet, at least one of the release sheets being light transmissive.

2. An article of manufacture according to claim 1 wherein the first release sheet is not light transmissive.

3. An article of manufacture according to claim 1 wherein the second release sheet comprises a conductive layer.

4. An article of manufacture according to claim 1 wherein the release sheet comprising the conductive layer is not light transmissive, and the second release sheet is light transmissive.

5. An article of manufacture according to claim 1 further comprising an adhesive layer disposed between the first release sheet and the layer of electro-optic medium.

6. An article of manufacture according to claim 1 further comprising an adhesive layer disposed between the layer of electro-optic medium and one of the release sheets.

7. An article of manufacture according to claim 6 having two adhesive layers, one adhesive layer being disposed between the layer of electro-optic material and each release sheet.

8. An article of manufacture according to claim 1 wherein the electro-optic medium is a rotating bichromal member or electrochromic medium.

9. An article of manufacture comprising a layer of a solid electro-optic medium operable for changing its optical state on application of an electric field thereto, and a release sheet disposed on one surface of the layer of solid electro-optic medium, the release sheet being peelable from the layer of solid electro-optic medium, the release sheet comprising an electrically conductive layer wherein the electro-optic medium comprises an electrophoretic medium having a plurality of electrically charged particles disposed in a fluid and capable of moving through the fluid on application of an electric field to the electro-optic medium.

10. An article of manufacture according to claim 9 wherein the electrically charged particles and the fluid are confined within a plurality of closed cavities formed in a substrate.

11. An article of manufacture according to claim 10 wherein the electrophoretic medium comprises single type of charged particles having a first color disposed in a dyed liquid having a second color different from the first color.

12. An article of manufacture according to claim 9 wherein the electrically charged particles and the fluid are confined within a plurality of capsules.

13. An article of manufacture according to claim 9 wherein the electrically charged particles and the fluid are present as a plurality of discrete droplets held within a polymeric continuous phase.

14. An article of manufacture according to claim 9 in which the fluid is gaseous.

* * * * *